April 26, 1966 W. R. HICKS 3,247,720
PRESSURE TRANSDUCER

Filed April 16, 1962 9 Sheets-Sheet 1

Weldon R. Hicks
INVENTOR

BY
Robert C. Peterson
ATTORNEY

April 26, 1966 W. R. HICKS 3,247,720
PRESSURE TRANSDUCER
Filed April 16, 1962 9 Sheets-Sheet 2

Weldon R. Hicks
INVENTOR

BY
Robert C. Peterson
ATTORNEY

April 26, 1966 W. R. HICKS 3,247,720
PRESSURE TRANSDUCER

Filed April 16, 1962 9 Sheets-Sheet 4

Weldon R. Hicks
INVENTOR

BY
Robert C. Peterson
ATTORNEY

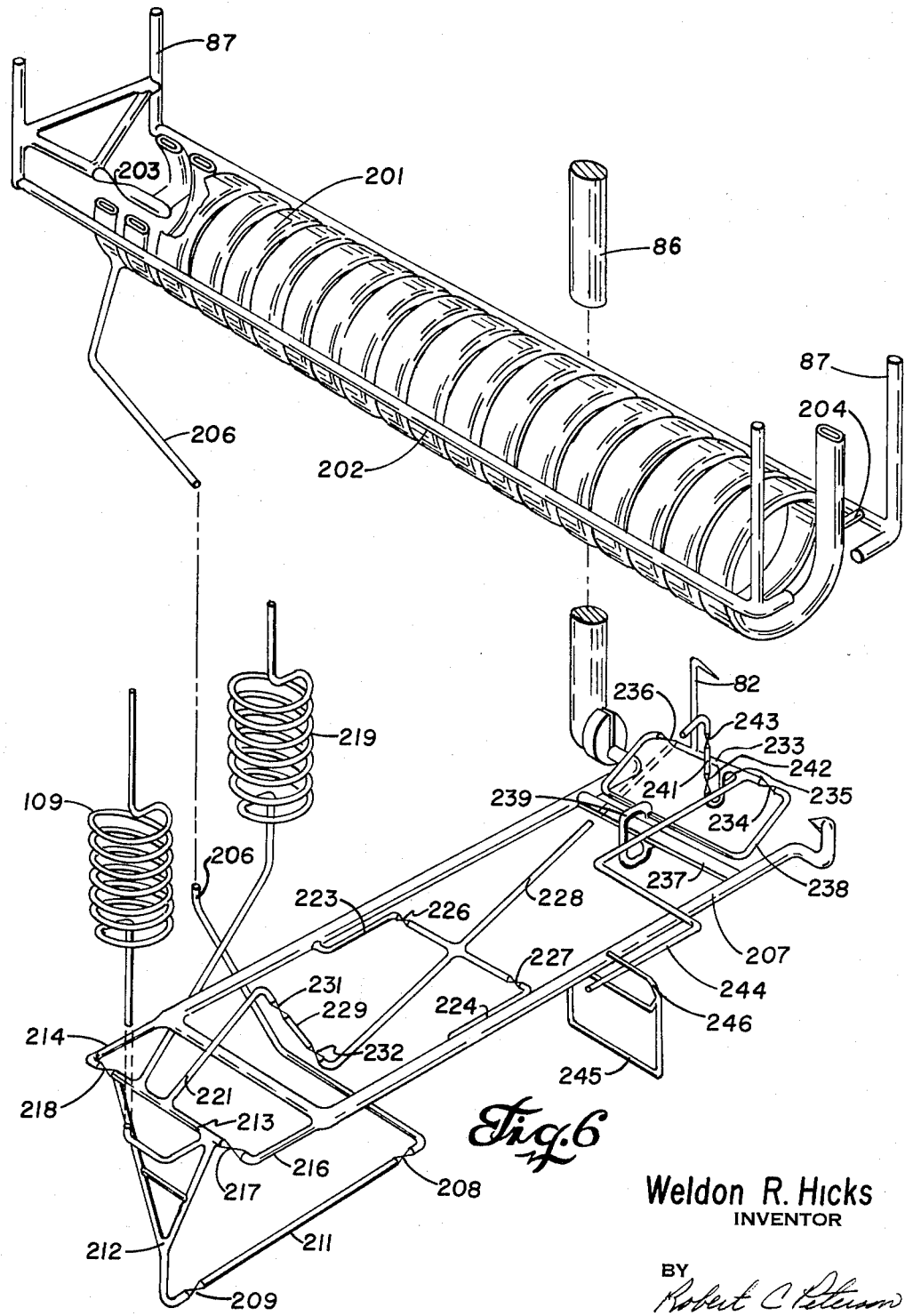

Weldon R. Hicks
INVENTOR

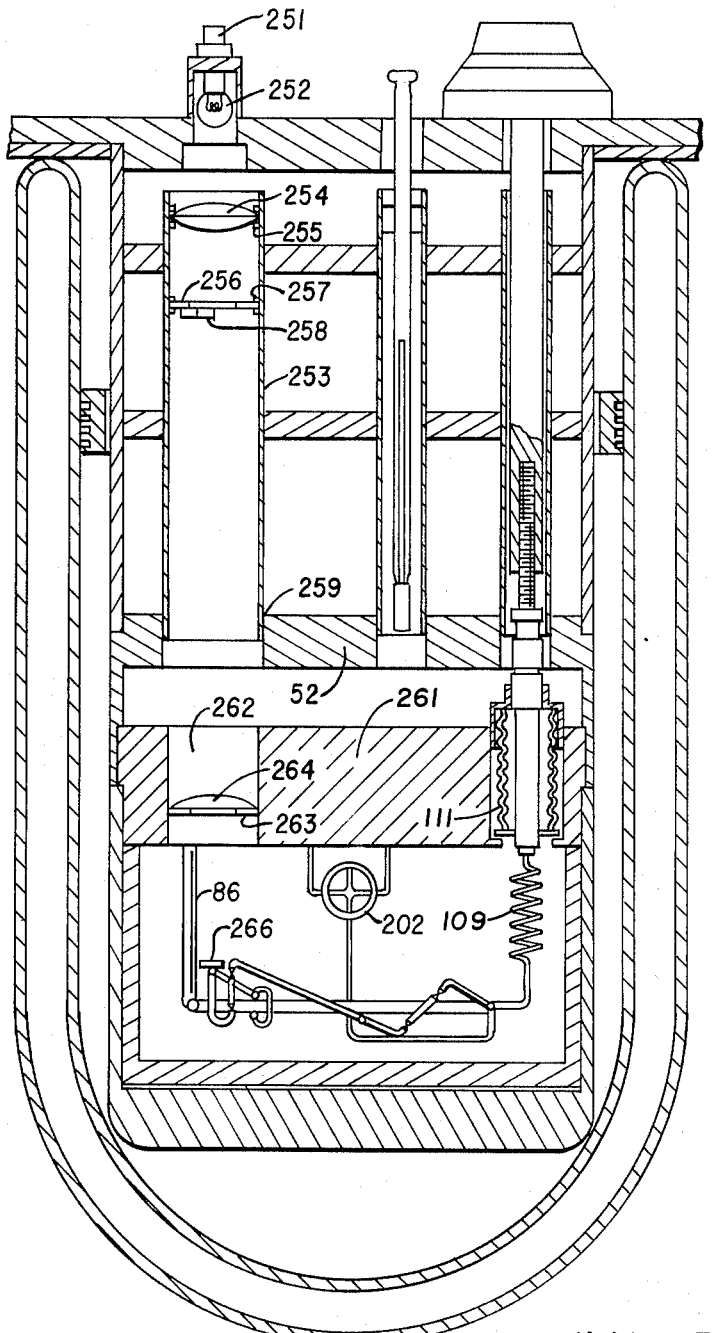

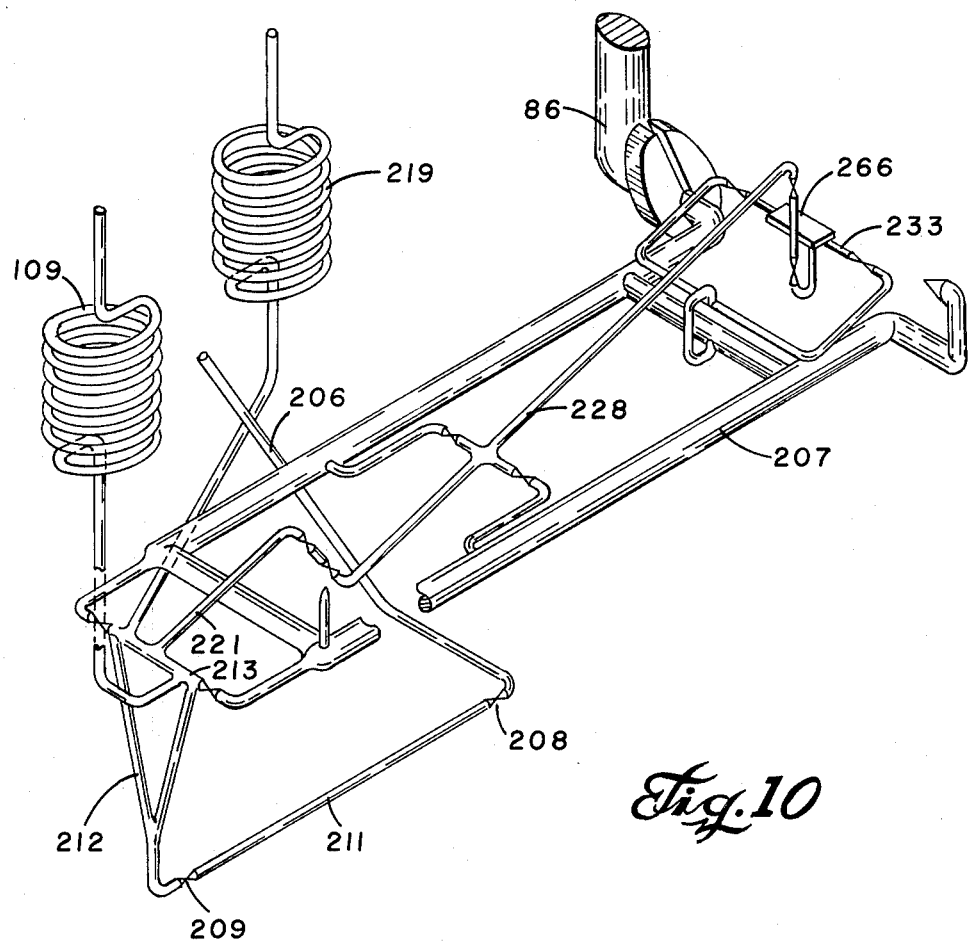

United States Patent Office 3,247,720
Patented Apr. 26, 1966

3,247,720
PRESSURE TRANSDUCER
Weldon R. Hicks, Houston, Tex., assignor to Texas Instruments Incorporated, Dallas, Tex., a corporation of Delaware
Filed Apr. 16, 1962, Ser. No. 187,820
8 Claims. (Cl. 73—411)

This invention relates to a pressure transducer, more particularly to a differential air pressure transducer and more specifically to a differential air pressure transducer which may be utilized with slight modifications to determine either absolute or gauge pressures.

The measurement of atmospheric pressure as an indication of elevations or altitude has long been recognized and utilized. Inasmuch as most instruments for measuring atmospheric pressure have poor resolution and atmospheric pressure varies at any given altitude, barometric surveying never has approached the accuracy achieved by precise transient surveys.

The air pressure transducer of the invention, herein disclosed, provides an instrument with a pressure sensitivity of 1/10,000 of an inch of mercury or 1 part in 32,000 of the total range.

Broadly, the apparatus of the invention consists of a fused quartz bourdon tube which transmits its helical rotation through a fused quartz lever assembly to deflect a needle which indicates a pressure force. The needle deflection is nulled by applying a quartz spring force thereagainst. The spring force is calibrated to provide a pressure readout. The apparatus may be provided wtih a second quartz spring which, by the adjustment of a screw, will provide differential pressure determinations from 0 to 500 inches of mercury with an accuracy of .0001 inch of mercury. The arrangement of the apparatus is such that absolute, differential or gauge pressure readings may be made with a high degree of accuracy.

It is therefore an object of the invention to provide a pressure transducer suitable for determining absolute, differential or gauge pressures;

It is another object of the invention to provide a pressure transducer where the pressure reading is obtained by optical nulling;

It is a further object of the invention to provide a pressure transducer which is simple in construction and size, compact, light-weight and portable, yet retains a sensitivity for minute pressure changes;

It is still another object of the invention to provide a pressure transducer utilizing a quartz bourdon tube coupled to a fused quartz meter movement incorporating an optical nulling system;

These and other objects and features of the invention will best be understood in conjunction with the appended claims and with reference to the drawings wherein:

FIGURE 6 is an exploded perspective view of the quartz bourdon tube and fused quartz meter movement utilized in the pressure transducer;

FIGURE 9 is part of a sectional view of the apparatus taken along the line 9—9 of FIGURE 7;

FIGURE 10 illustrates the modification to the fused quartz meter movement depicted in FIGURE 6 utilized with the photocell readout embodiment of the invention as shown in FIGURES 7, 8 and 9.

Figures 1, 5:
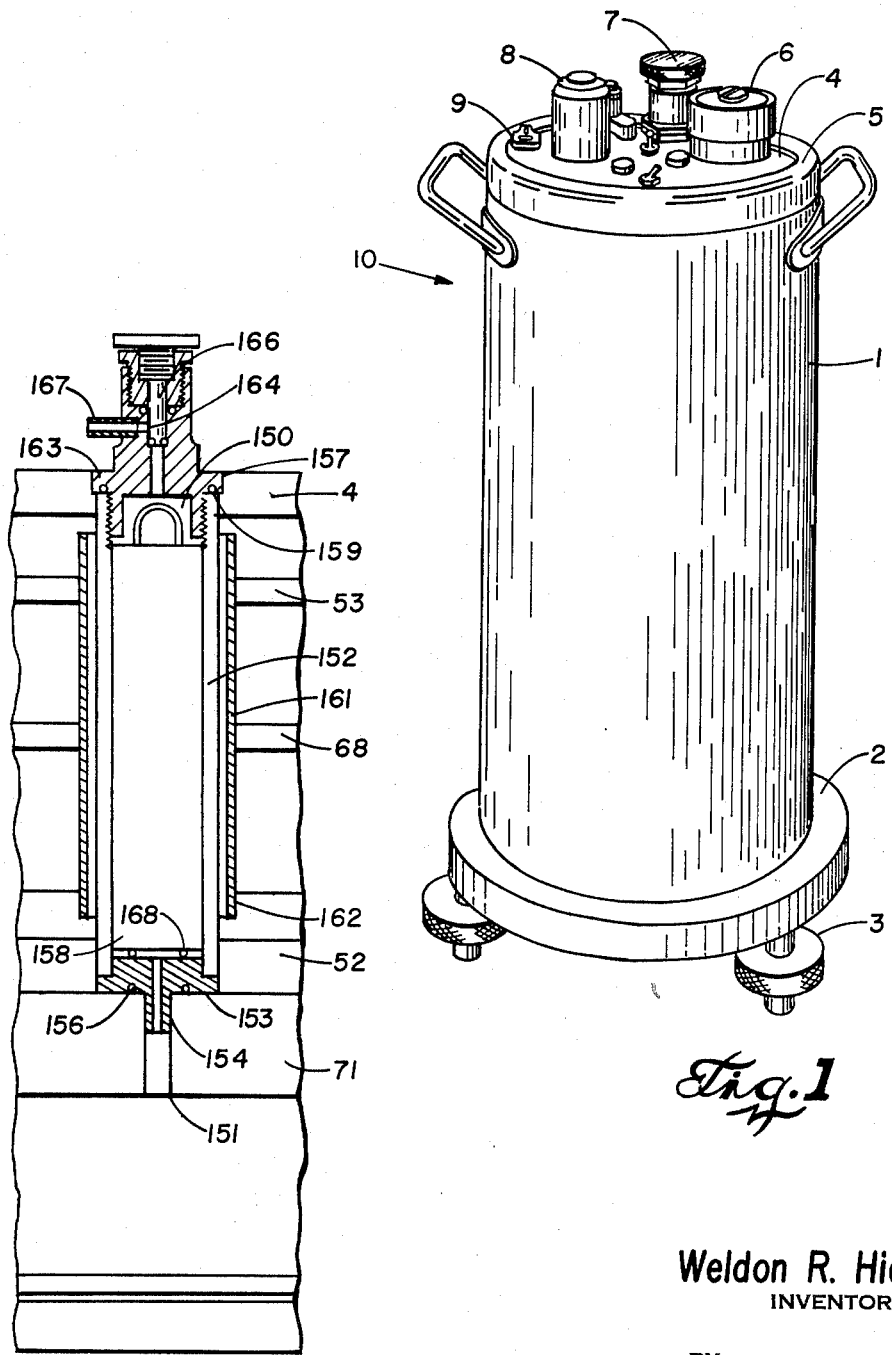
FIGURE 1 is a perspective of the assembled pressure transducer.
FIGURE 5 is a partially broken away section view taken along the line 5—5 of FIGURE 2.
Figure 2:
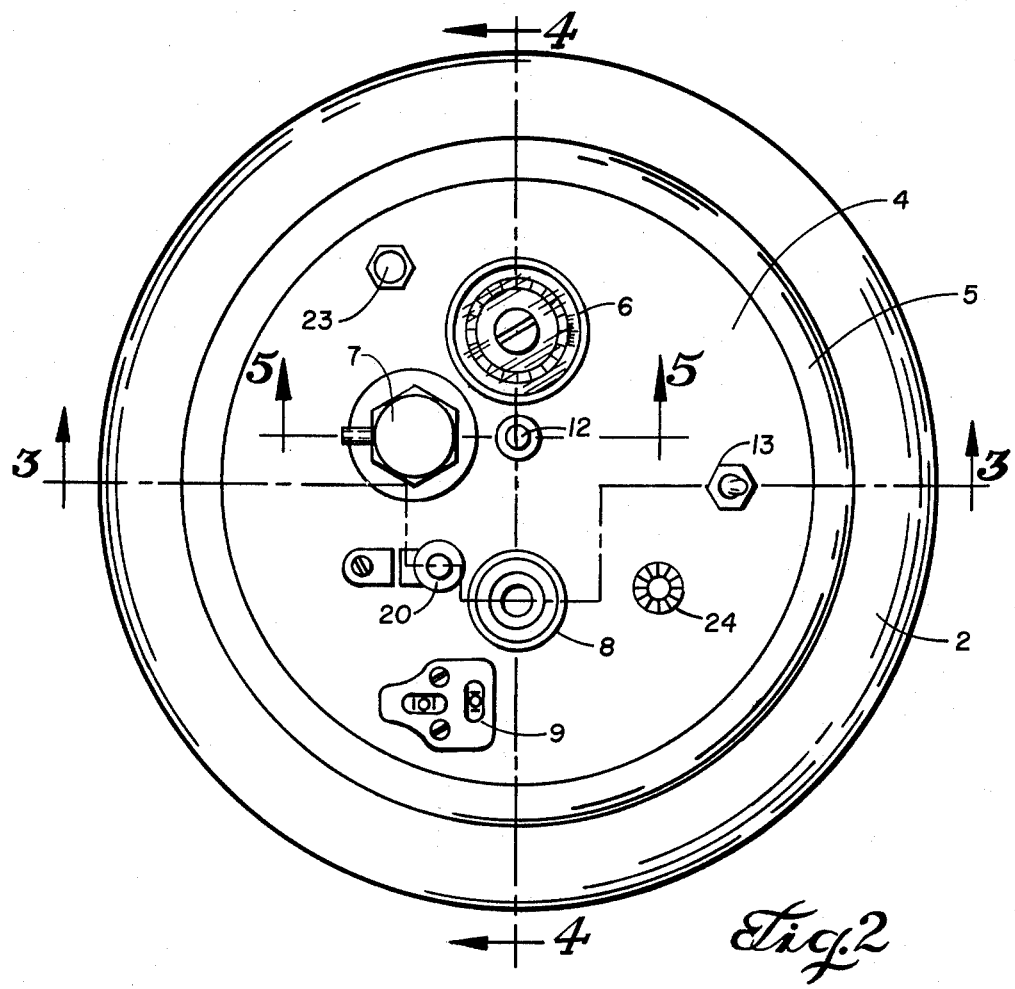
FIGURE 2 is a top view of the pressure transducer housing illustrating various features of the apparatus.

Referring particularly to FIGURES 1 and 2 there is depicted the pressure transducer of the invention generally identified as 10. A tubular housing 1 which has a flanged area 2 provides support for leveling legs 3. The housing is provided with a top cover 4 sealed along its periphery by a flexible material 5. Top plate 4 supports a mircometer adjusting dial 6, a valve housing 7, an optical eyepiece 8 and a sight level 9. Also, top plate 4 contains power input jack 23 and pilot light 24 which indicates power is applied for internal heating. A thermometer port 12 and a power switch 13 are provided in top cover 4.

Figure 3:
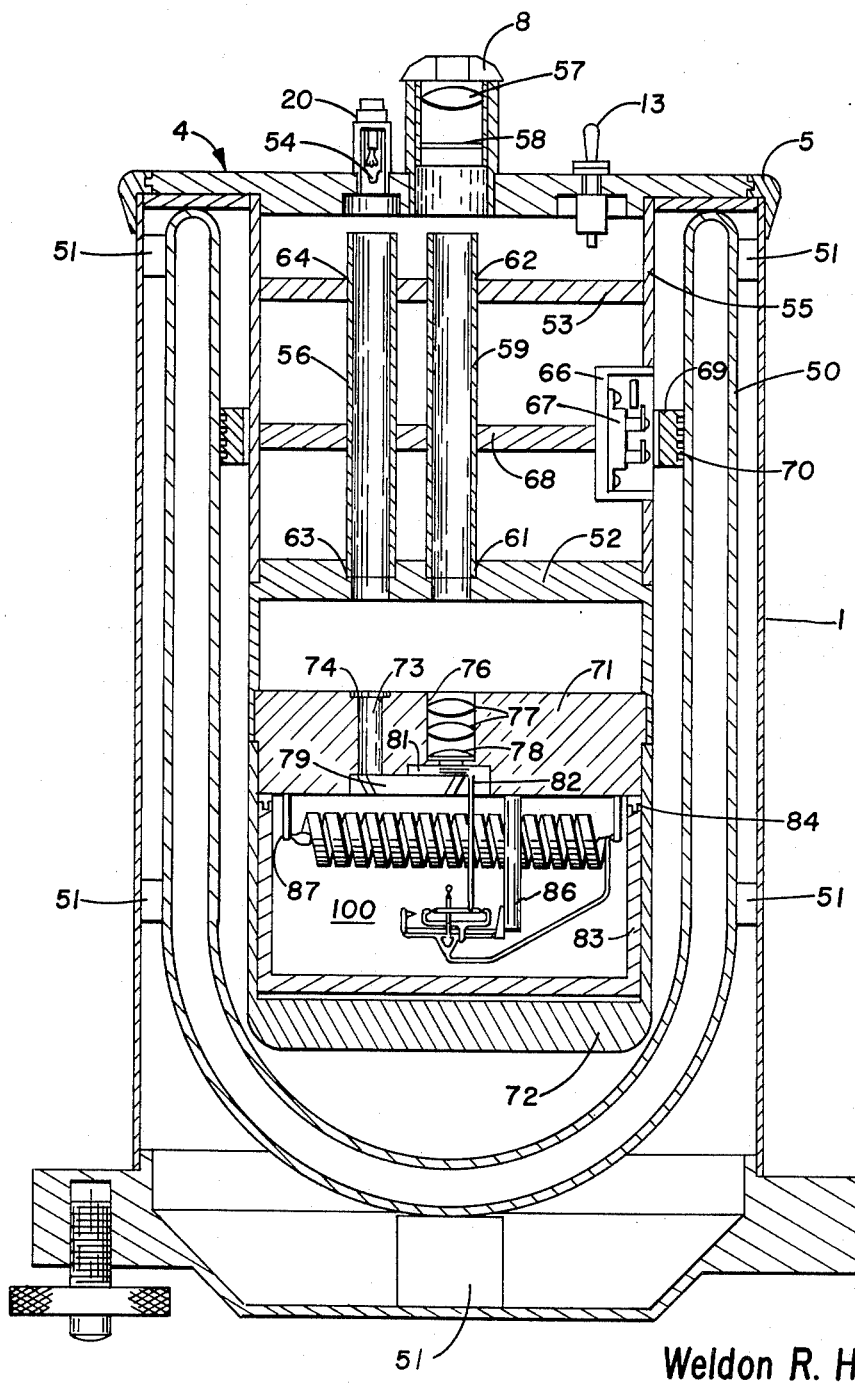
FIGURE 3 is a section through the apparatus taken along the line 3—3 of FIGURE 2.
Figure 4:
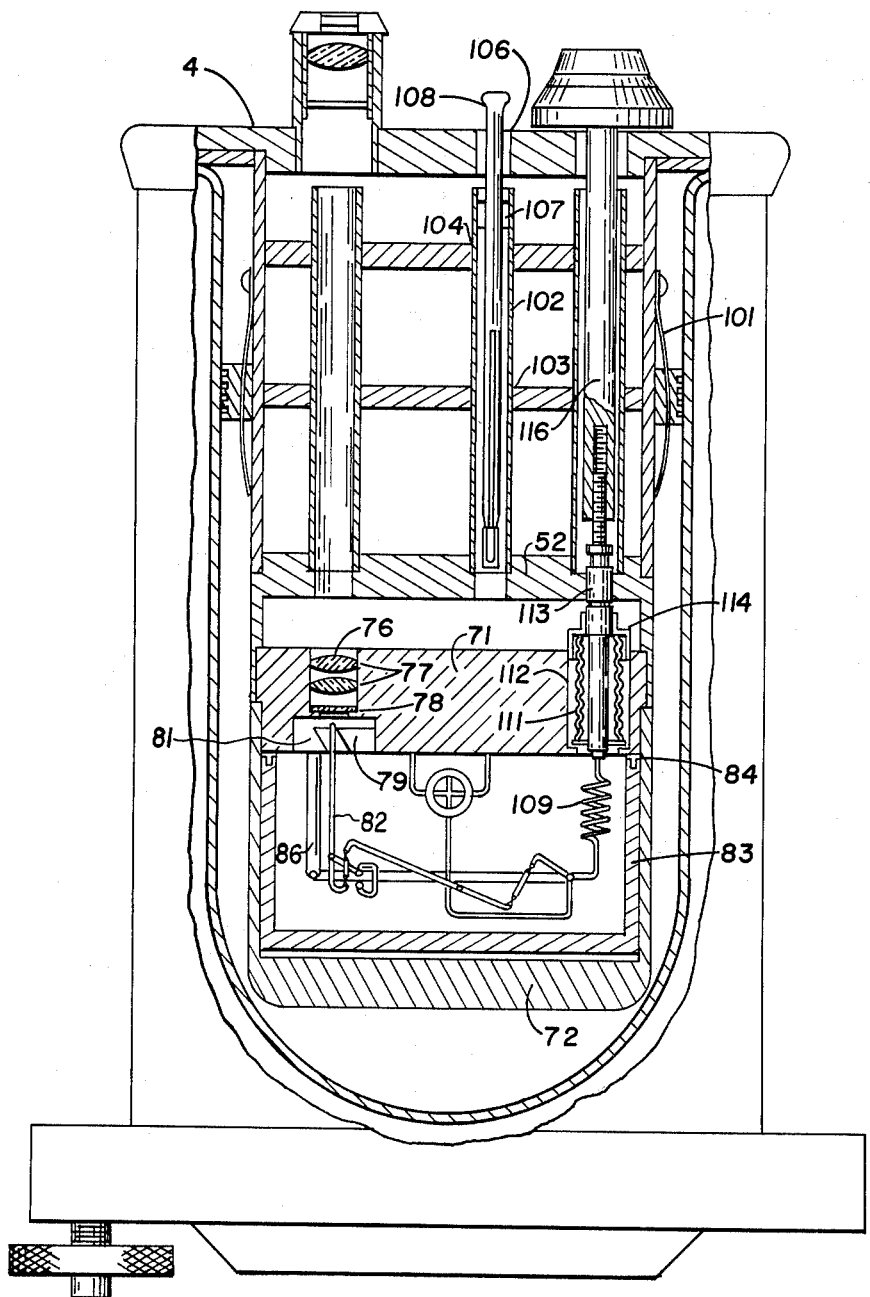
FIGURE 4 is a cross section of the apparatus illustrated in FIGURE 2 taken along the line 4—4.

The construction of the pressure transducer apparatus will best be understood with reference to FIGURES 2, 3, 4, 5 and 6. Referring specifically to FIGURES 2, 3 and 4, the apparatus consists of a dewar flask 50 supported in casing or housing 1 by spacers 51. The housing 1 is closed by closure or top plate 4, and housing seal 5 secures the top plate 4 to the housing 1. Attached to and suspended from top plate 4 is ballast housing 55. The bottom of ballast housing 55 is sealed by a ballast base plate 52 and at its upper end near the top plate 4 is ballast housing top seal 53. Within ballast housing 55 is provided a low thermal conductivity silica material such as Sanocel. The ballast housing 55 and top seal 53 are made of plastic whereas the ballast housing base plate 52 is made of metal, for example, aluminum. Top plate 4 contains a light housing 20 with a light source 54 therein. Aligned with the light housing 20 and passing through the ballast housing top seal 53 is a light tube 56 held in place by a counterbore 63 in base plate 52 and an aperture 64 through top seal 53. Eyepiece 8 provided in top plate 4 contains a focus lens 57 and a reticle 58 as a null reference. In alignment with eyepiece 8 is a microscope tube 59 held in place by a counterbore 61 in plate 52 and an aperture 62 in top seal 53. A thermoswitch housing 66 is provided recessed in ballast housing 55 and retains thermoswitch 67 therein. A thermal ballast plate 68 is provided within the ballast housing 55 and contacts the thermoswitch housing 66. The purpose of the thermal ballast plate 68 will be later described. In the proximity of the thermoswitch 67, a heater 69 is provided in intimate contact with the dewar flask 50. Wire windings 70 surround the periphery of heater 69 and provide electrical power for resistive heating thereof. Power is supplied to the heater through the thermoswitch 67 by wiring (not shown) from a power input plug 23 in top plate 4. The thermoswitch 67 supplies power through metal contacts 101 (which are best illustrated in FIGURE 4) to the heater wires 70 of heater 69.

An evacuatable element housing or container which encloses the fused quartz bourdon tube sensing element and meter movement linkage assembly generally referred to by the number 100 consists of a head 71 and a jacket 72 which are secured by screws not shown. The element container is attached to and suspended from ballast housing base plate 52 by screws (not shown) in the periphery thereof. Head 71 contains a throughbore 73 which is sealed at its upper end by a glass window 74. The throughbore 73 is aligned with light tube 56. A port 76 is provided in head 71 aligned with microscope tube 59. Focusing optics 77 are provided within the port 76 and are sealed by an optical window 78. In alignment with throughbore 73 and port 76 and attached to head 71 is a prism 79 which redirects the light impinging thereon into the focusing optics 77 within port 76. The head 71 is cut away around port 76 to provide a slot 81 for needle pointer 82 interposing the light path between the prism 79 and the focusing optics 77. Inside jacket 72, a cup 83 is provided having an O-ring seal 84 to head 71. This arrangement provides a vacuum-tight seal to the element container. Head 71, jacket 72 and cup 83 are made of high thermal conductive materials such as metal. To maintain a relatively constant temperature within the element housing the heater 69 operating within the dewar flask 50 maintains a relatively constant temperature within the housing. Since light tube 56 and microscope tube 59 would have a tendency to transmit heat away from the element container, ballast base plate 52 and the thermal ballast plate 68 are made of high thermal conductivity material, thus tending to suppress heat losses. In alignment with thermometer port 12 in top plate 4, thermometer well 102 is provided within the ballast housing seated in base plate 52 and extending through apertures 103 and 104 in thermal ballast plate 68 and ballast housing top seal 53. Near the uppermost portion of thermometer well 102 is mounted a sponge rubber washer 107 to provide sealing support for a thermometer 108 inserted therein. The sensing element and the meter movement linkage assembly 100 are supported from head 71 by metallic mounting post 86 and fused quartz mounting posts 87.

To provide optical nulling to the apparatus the meter movement linkage is coupled through a quartz spring 109 to a back lash free micrometer tensioning assembly. The assembly consists of a drive rod 113, a collar bearing 114 surrounding rod 113 and sealingly attached in a throughbore 112. A bellows 111 surrounds the rod 113 and is affixed at one end against collar bearing 114 and at its other end to shaft 113, drive rod 113 is attached to the quartz tensioning spring 109. The upper end of drive rod 113 is threaded and received in a hollow, threaded micrometer shaft 116. Coupled to micrometer shaft 116 is vernier micrometer dial 6 arranged to rotate shaft 116 which in turn translates rotational movement of the micrometer dial 6 into axial movement of drive rod 113.

As best seen in FIGURE 5, the head 71 of the element container has a throughbore 151, a desiccant housing 150 is provided by a casing 152 having a bottom plug 153 with a tubular projection 154 adapted to be received in the throughbore 151. An O ring 156 provides sealing between head 71 and bottom plug 153. The casing 152 extends into top plate 4 having a throughbore 157 therein for this purpose. Within the housing 150 resting on rubber spacer 168 is placed a desiccant container 158 with a desiccant medium therein. Surrounding casing 152 in spaced relation is an outer shell 161 seating in counterbore 162 in base plate 52, and passing through ballast plate 68 and top seal 53, and terminating just below top plate 4.

A valve body 163 is seated within throughbore 157 in top plate 4 and rests against casing 152. The valve body 163 is sealed against the casing 152 by O ring 159. The valve body 163 has an L-shaped throughport 164. A rotatable valve stem 166 is arranged within valve body 163 for rotational movement to open and close throughport 164. A nipple 167 is inserted in one end of throughport 164 to provide an inlet nozzle to the valve body 163.

Referring specifically to FIGURE 6 a detailed description of the fused quartz bourdon tube sensing element and meter movement linkage 100 will be presented. A quartz bourdon 201 is suspended from a fused quartz frame 202 by a torsion bearing 203 at one end and by a fused quartz link 204 at the other end. In order to determine absolute pressures, fused quartz bourdon tube 201 is evacuated and sealed. The fused quartz frame 202 is attached to head 71 by mounting posts 87 (see FIGURE 3). Attached to the fused quartz bourdon tube 201 near torsion bearing 203 and along its helical periphery is a lever arm 206. A fused quartz frame 207 is attached to support post 86 (see FIGURE 3). The quartz frame 207 provides a support for the meter movement linkage to be described. Lever arm 206 is attached through hinges 208 and 209 by a member 211 to a yoke frame 212. Yoke frame 212 is attached to a torsion rod 213 supported from the frame 207 extensions 214 and 215 by torsion bearings 217 and 218. Attached to torsion rod 213 is a fused quartz spring 109 arranged in such a manner that tensioning of spring 109 applies torque to torsion rod 213. As previously noted the fused quartz spring 109 is attached to micrometer drive rod 113 (see FIGURE 4). Optionally a second fused quartz spring 219 may be provided attaching to torsion rod 213 opposing spring 109 and acting as a zero or reset adjust for the instrument, thereby providing incremental ranges of pressure for the transducer. The upper end of spring 219 would be attached to a back lash free micrometer tensioning assembly in a similar manner as spring 109 except that a screw slot would be used instead of a micrometer dial. The tension of spring 219 would be adjusted by inserting a screwdriver in the slot therefor and rotating the micrometer screw.

Attached to torsion rod 213 is a lever arm 221. A pair of mounting members 223 and 224 pivotally support a cross bar lever arm 228 at torsion bearings 226 and 227 which is coupled to lever arm 221 through linkage 229 and hinges 231 and 232. A torsion rod 233 is supported at torsion bearings 234 and 236 from cross member 237 through fork 238 attached to U-shaped linkage 239 coupled to member 237. The rotational movement of lever arm 228 about its torsion bearings 226 and 227 is transmitted to torsion rod 233 by linkage 241 having hinges 242 and 243 through member 235. Attached to torsion rod 233 and extending parallel to frame 207 is a motion limit arm 244. The arm extends between the yoke 246 of limit stop 245 which is attached to frame 207. Attached to torsion rod 233 and extending upward therefrom is needle pointer 82 (see FIGURES 3 and 4).

In operation, the helical rotation of the burdon tube 201 is transmitted through lever arm 206, member 211 and yoke 212 to apply torque to torsion rod 213. The torque is transferred by lever arm 221 to lever arm 228 which rotates on its bearings 226 and 227 and transmits rotational movement through linkage 241 and member 235, thus applying a torque to torsion rod 233 which in turn rotationally deflects needle pointer 82. The deflection of pointer 82 is nulled by adjusting micrometer dial 6 to apply the required tensioning of quartz spring 109.

The desired sensitivity of the apparatus may be achieved with the dimension herein suggested. The dewar flask 50 may be about 4 to 5 inches in diameter and about 12 inches in length. The fused quartz bourdon tube 201 may have an inner cross sectional opening about 2–3 mm. by 1 mm. The bourdon tube 201 helix may be about 12 mm. inner diameter with 6 to 8 coils per inch. The quartz frame 207 may be about 2 to 3 inches long by ½ to 1 inch wide. The fused quartz springs 219 and 109 may be about ¼ inch inner diameter by about ⅓ inch long with 60 coils per inch. The hinges 208 and 209 may be about one mil diameter. Torsion bearings 217 and 218 may be about 4 mils diameter. Torsion bearings 226 and 227 may be about 1 to 2 mils diameter and torsion bearings 234 and 236 may be about 3 to 4 microns diameter. From the dimensions noted for the above elements, appropriate dimension for the entire apparatus will be apparent.

In a further embodiment the pressure transducer apparatus is modified to utilize a photocell readout. The modifications necessary are illustrated in FIGURES 7, 8, 9 and 10, wherein parts found in both embodiments have identical reference numerals.

Figure 7:
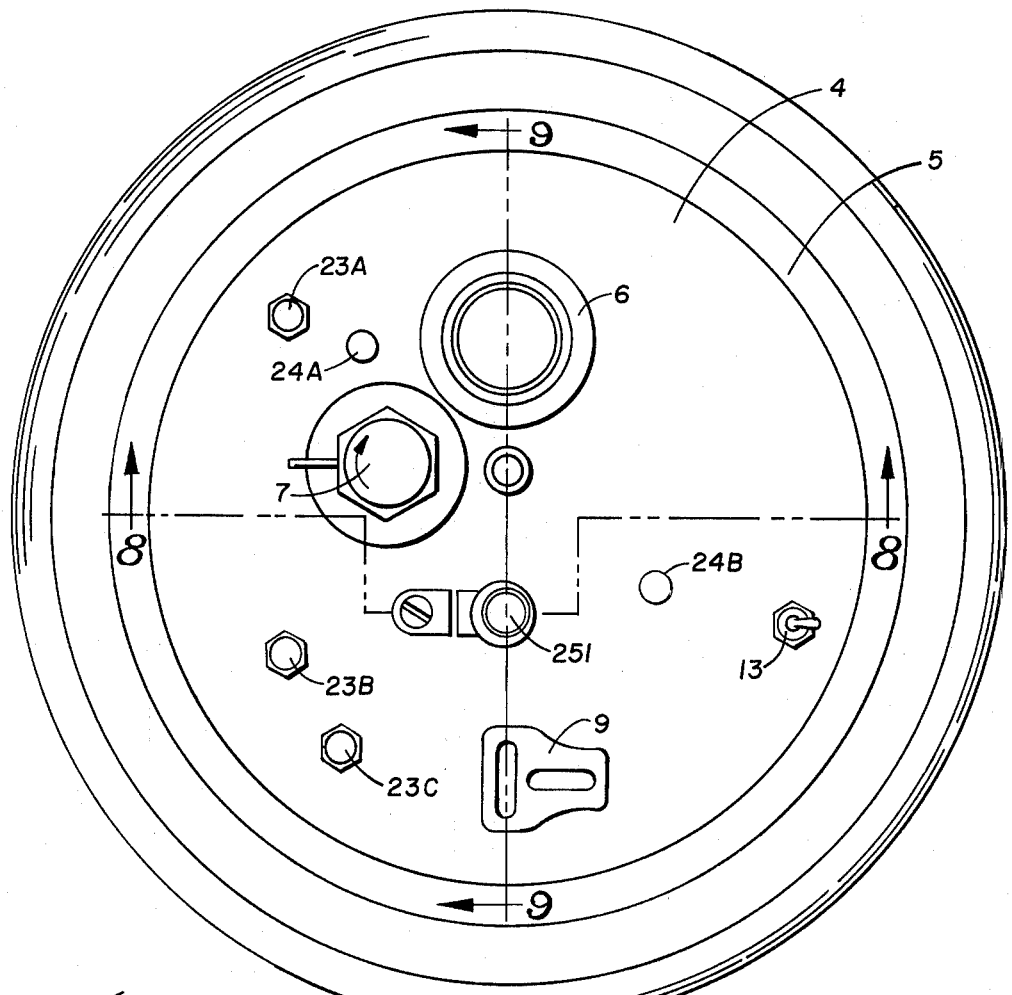
FIGURE 7 is a top view of the assembled pressure transducer of another embodiment of the invention.
Figure 8:
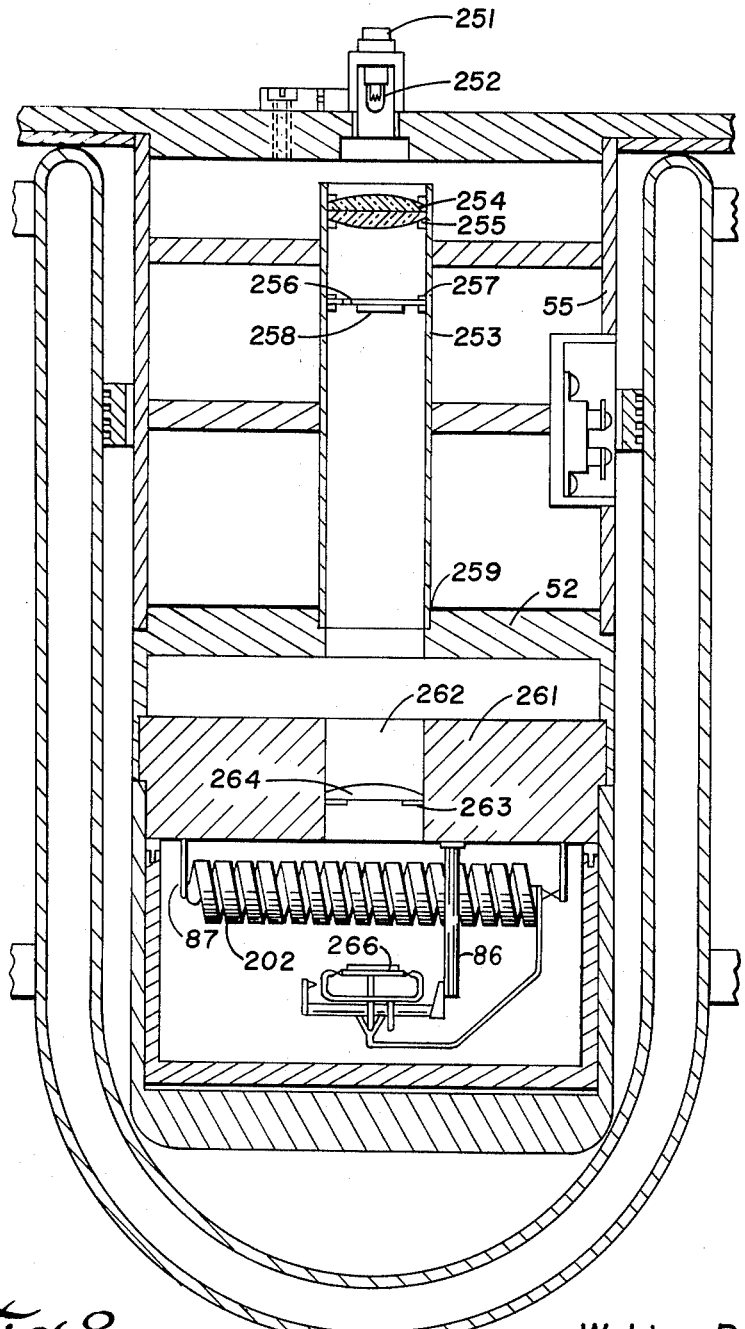
FIGURE 8 is part of a sectional view along the line 8—8 of FIGURE 7.

Referring to FIGURES 7, 8 and 9 of the pressure transducer apparatus, a modified embodiment of the invention will be described. The ballast housing and heater arrangements generally are identical with those illustrated in FIGURES 3 and 4, but with some relocation. Input jack 23A supplies power to the heater 69. Pilot light 24A indicates when the heater is on. Input jack 23B supplies power to light source 252 through switch 13. When switch 13 is on, pilot light 24B is lit. Top plate 4 supports light housing 251 with a light source 252 therein. In alignment with the light housing 251 and passing through the ballast housing 55 is a photocell and light tube 253. Positioned in tube 253 is a light condensinging lens 254 held therein by metal mountings 255. A slotted disc 256 is mounted by metal grommet 257 within the tube 253. On the side opposite the condensing lens 254 mounted to the disc 256 are photocells 258. The tube 253 is seated in a counterbore 259 in plate 52. The element section or container of the apparatus which encloses the fused quartz bourdon tube sensing element and meter movement linkage assembly consists of a head 261 having a throughbore 262 which replaces throughbore 73 and port 76 of the embodiment illustrated in FIGURES 3 and 4. Within the throughport 262 is a washer 263 attached at its periphery to the annular surface of throughport 262 mounting an objective lens 264 therein. Quartz bourdon tube 202 is mounted to head 261 by brackets 87 (see FIGURES 3 and 6). The meter movement linkage has the fused quartz spring 109 attached to drive rod 113 retained within head 261 similar to that illustrated in FIGURE 4. Attached to the fused quartz linkage in lieu of the needle pointer 82 is a fused quartz mirror 266 which is aligned wth respect to tube 253 such that light from source 252 transmitted through the condensing lens 254 and to the objective lens 264 impinges on the mirror 266 and is reflected back through the objective lens 264 to be focused on photocells 258. The photocell 258 is wired to an output jack 23C for readout on a microampmeter or to a servo recorder for recording a permanent record.

FIGURE 10, a partial view in perspective, illustrates the fused quartz mirror 266 attached to torsion rod 233 which is the only necessary modification of the fused quartz bourdon tube sensing element and meter movement linkage as illustrated in FIGURE 6 to utilize the photocell readout embodiment of the invention. Likewise as illustrated in FIGURE 6, an optional fused quartz spring 219 may be provided which would be mounted by a similar arrangement as is illustrated in FIGURES 4 and 9. Fused quartz spring 219 would then provide a zero adjustment for the photocell embodiment.

In operation of the photocell readout embodiment of the pressure transducer, expansion and contraction movement of the helical quartz spring 202 would be transmitted through lever arm 206, member 211 and yoke 212 to apply torque to the torsion rod 213. Through a lever arrangement identical to that illustrated in FIGURE 6, the torque of torsion rod 213 would be transferred to torsion rod 233 to change the angle of incidence of the light source 252 impinging on the fused quartz mirror 266 thus changing the angle of reflection and hence the amount of light reflected by fused quartz mirror 266 onto photocell 258. The variation of light intensity impinging on photocell 258 would then indicate the pressure force applied to the bourdon tube 202. By nulling the deflection of mirror 266 for maximum output of photocell 258, the pressure may be ascertained from micrometer dial 6.

It should be understood that various modifications and changes in the arrangement of the fused quartz assembly by incorporating additional linkage to increase or decrease the sensitivity of the apparatus will become apparent. Also, it should be appreciated that various modifications in the readout portion of the apparatus will become immediately apparant to those skilled in the art. Such variations as noted above are intended to be and are within the scope of the invention as defined by the appended claims.

What is claimed is:
1. A transducer for determining fluid differential pressure comprising:
 (a) a dewar flask,
 (b) a casing surrounding and supporting said dewar flask and open at one end,
 (c) a closure plate attached across the open end of said casing,
 (d) an evacuatable housing mounted within said dewar flask, said evacuatable housing having a light-admitting window sealably retained within a throughbore therein, a viewing window sealably retained within a throughport therein and a collar bearing member sealably retained within an aperture therein,
 (e) a thermal ballast housing mounted within said dewar flask adjacent said evacuatable housing,
 (f) a prism mounted within said evacuatable housing spaced apart from said light-admitting window and said viewing window arranged to transmit light entering said light-admitting window into the field of view of said viewing window,
 (g) a light source arranged to transmit light into said light-admitting window,
 (h) a fused quartz bourdon tube suspended within said evacuatable housing by a torsion bearing at one end and a fixed support at the other end,
 (i) a fused quartz torsion rod mounted within said evacuatable housing suspended from a quartz frame by a torsion bearing.
 (j) a reference pointer attached to said torsion rod and interposed within the field of view of said viewing window,
 (k) a fused quartz linkage attached to said one end of said bourdon tube coupling said bourdon tube to said torsion rod arranged to translate the motion of said bourdon tube into a deviation of said pointer,
 (l) a fused quartz spring attached to said linkage to apply a restoring force opposed to the deviation of said pointer,
 (m) a viewing microscope tube having a reference reticle therein mounted by said closure plate extending through said thermal ballast housing and aligned optically with said viewing window such that the deviation of said reference pointer is within the field of view of said viewing microscope tube,
 (n) a reciprocable drive shaft extending through said collar bearing sealably attached thereto and attached at one end to said quartz spring,
 (o) a micrometer mechanism including a micrometer dial and shaft supported by said closure plate and extending into said thermal ballast housing, the shaft of said micrometer mechanism threadably retaining said reciprocable drive shaft, said micrometer mechanism so arranged that operation thereof transfers linear motion to said reciprocable drive shaft resulting in changing the tension of said spring to null the deviation of said reference pointer,
 (p) means to expose said bourdon tube to a fluid differential pressure, and
 (q) readout means referenced to said micrometer dial to determine the fluid differential pressure exerted on said bourdon tube when the deviation of said reference pointer is nulled.

2. The apparatus of claim 1 including means to maintain the temperature in said evacuatable housing substantially constant.

3. The apparatus of claim 1 including a fused quartz reset spring to provide incremental ranges to the transducer.

4. A transducer for determining fluid differential pressure comprising:

(a) a dewar flask,
(b) a casing surrounding and supporting said dewar flask and open at one end,
(c) a closure plate attached across the open end of said casing,
(d) an evacuatable housing mounted within said dewar flask, said evacuatable housing having an optical window sealably retained within a throughport therein and a collar-bearing member sealably retained within an aperture therein,
(e) a thermal ballast housing mounted within said dewar flask adjacent said evacuatable housing,
(f) a fused quartz bourdon tube suspended within said evacuatable housing by a torsion bearing at one end and a fixed support at the other end,
(g) a fused quartz torsion rod mounted within said evacuatable housing suspended from a quartz frame by a torsion bearing,
(h) a reference mirror attached to said torsion rod arranged to reflect light entering from said optical window back through said optical window,
(i) a fused quartz linkage attached to said one end of said bourdon tube coupling said bourdon tube with said torsion rod arranged to translate the motion of said bordon tube into a movement of said reference mirror,
(j) a fused quartz spring attached to said linkage to apply a restoring force opposed to the movement of said mirror,
(k) a reciprocal drive shaft extending through said collar bearing sealably attached thereto and attached at one end to said quartz spring,
(l) a micrometer mechanism including a micrometer dial and shaft supported by said closure plate and extending into said thermal ballast housing, the shaft of said micrometer mechanism threadably retaining said reciprocal drive shaft, said micrometer mechanism being so arranged that the operation thereof transfers linear motion to said reciprocal drive shaft resulting in changing the tension of said spring to null the movement of said reference mirror,
(m) a tubular housing mounted within said thermal ballast housing containing at one end thereof a condensing lens and open at the other end, said tubular housing being aligned with said other end in the field of view of said optical window,
(n) a photocell detector mounted intermediate the ends of said tubular housing in such a manner as to be exposed solely to light reflected from said reference mirror and permitting passage therearound of light from said condensing lens, said photcell having a maximum output when the movement of said reference mirror is nulled,
(o) a light source arranged to transmit light into said condensing lens,
(p) means to expose said bourdon tube to a fluid differential pressure, and
(q) readout means reference to said micrometer to determine the fluid differential pressure on said bourdon tube when the movement of said reference mirror is nulled.

5. The apparatus of claim 4 including means to maintain the temperature in said evacuatable housing substantially constant.

6. The apparatus of claim 4 including a fused quartz reset spring to provide incremental ranges to the transducer.

7. A transducer for determining fluid differential pressure comprising:
(a) a dewar flask,
(b) a casing surrounding and supporting said dewar flask,
(c) cover means to cover the mouth of said dewar flask,
(d) an evacuatable housing supported within said dewar flask,
(e) thermal ballast mounted within said dewar flask adjacent said evacuatable housing,
(f) a fused quartz bourdon tube supported within said evacuatable housing by a torsion bearing at one end and a fixed support at the other end,
(g) a fused quartz torsion rod mounted within said evacuatable housing and suspended from a quartz frame by a torsion bearing,
(h) a reference indicator connected to said torsion rod,
(i) fused quartz linkage means connected said bourdon tube to said torsion rod for translating motion of said bourdon tube into a deviation of said reference indicator,
(j) a fused quartz spring means connected to said linkage means to apply a restoring force opposing said deviation,
(k) driving means sealably penetrating said evacuatable housing for driving said spring means to adjust said force and thereby to move said reference indicator to a null position,
(l) means sealably penetrating said evacuatable housing for detecting when said reference indicator is in said null position,
(m) means for exposing said bourdon tube to a fluid differential pressure, and
(n) means calibrated in terms of pressure and responsive to the movement of said driving means for measuring the extent to which said spring means is driven in moving said reference indicator to a null position, thereby to produce an indication of said differential pressure.

8. A transducer for determining fluid differential pressure comprising:
(a) a dewar flask,
(b) a casing surrounding and supporting said dewar flask,
(c) cover means to cover the mouth of said dewar flask,
(d) an evacuatable housing supported within said dewar flask,
(e) thermal ballast mounted within said dewar flask adjacent said evacuatable housing,
(f) a fused quartz bourdon tube supported within said evacuatable housing by torsion bearing at one end and a fixed support at the other end,
(g) a fused quartz torsion rod mounted within said evacuatable housing and suspended from a quartz frame by a torsion bearing,
(h) a reference indicator connected to said torsion rod,
(i) fused quartz linkage means connecting said bourdon tube to said torsion rod for translating motion of said bourdon tube into a deviation of said reference indicator,
(j) a fused quartz spring means connected to said linkage means to apply a restoring force opposing said deviation,
(k) driving means sealably penetrating said evacuatable housing for driving said spring means to adjust said force, thereby to move said reference indicator to a null position,
(l) a lamp supported exterior to said evacuatable housing,
(m) viewing means sealably extending into said evacuatable housing for observing said reference indicator near said null position, said viewing means including reference means for detecting when said reference indicator is in said null position,
(n) means for transmitting the light of said lamp into the field of view of said viewing means to illuminate said reference indicator near said null position,
(o) means for exposing said bourdon tube to a fluid differential pressure, and (p) means calibrated in terms of pressure and responsive to the movement of said driving means for measuring the extent to which said spring is driven in moving said reference indicator to a null position, thereby to produce an indication of said differential pressure.

References Cited by the Examiner

UNITED STATES PATENTS

| | | | |
|---|---|---|---|
| 2,732,718 | 1/1956 | Cornelison | 73—382 |
| 2,842,351 | 7/1958 | Rodder | 73—382 X |
| 2,934,729 | 4/1960 | Bourns | 73—398 X |
| 3,052,125 | 9/1962 | Damrel | 73—382 |
| 3,067,617 | 12/1962 | Buck | 73—418 X |
| 3,096,652 | 7/1963 | Cornelison | 73—410 X |
| 3,103,820 | 9/1963 | Haalck | 73—382 |

OTHER REFERENCES

Publication: Article by William Vaughan, "The Bodenstein Quartz Spiral Manometer," in Review of Scientific Instruments, March 1947, vol. 18, No. 3, pp. 192–194.

RICHARD C. QUEISSER, *Primary Examiner.*